United States Patent [19]

Longacre, Jr.

[11] Patent Number: 4,523,224

[45] Date of Patent: Jun. 11, 1985

[54] COLOR FILTER WHEEL SYNCHRONIZER

[75] Inventor: Andrew Longacre, Jr., Skaneateles, N.Y.

[73] Assignee: Welch Allyn Inc., Skaneateles Falls, N.Y.

[21] Appl. No.: 453,471

[22] Filed: Dec. 27, 1982

[51] Int. Cl.$^3$ .............................................. H04N 9/04
[52] U.S. Cl. ...................................................... 358/42
[58] Field of Search ...................... 358/98, 42, 58, 275

[56] References Cited

U.S. PATENT DOCUMENTS 3,654,385  4/1972  Flagle .............................. 358/42 X
3,913,128  10/1975  Van den Bosch ..................... 358/42
4,331,984  5/1982  Bryan et al. ........................ 358/275

Primary Examiner—John C. Martin
Assistant Examiner—Michael Dunnam
Attorney, Agent, or Firm—Bruns and Wall

[57] ABSTRACT

Apparatus for synchronizing rotational speed of a color filter wheel to a video field rate using a stepping motor drive. The derivation of the stepping rate is taken directly from the video system's master clock through dividers and a phase locked loop which provide the required fractional rate division. An integrating capacitor in the phase locked loop controls the output of a voltage control oscillator so that at power up the capacitor is charged at a relatively slow rate thus ramping up the stepping rate of the motor until phase locking is achieved. A pair of optical switches monitor the rotation of the filter wheel. If the switches are not made within a predetermined number of steps, the integrating capacitor is discharged and the ramping procedure reinitiated. Final synchronization of the wheel in correct orientation with the video field is obtained by thorough use of a coincidence detector circuit that causes the motor to be stepped at a slower than normal rate until coincidence between a video system generated field index signal and an optically derived wheel rotational index signal is detected at which time the stepping rate is brought up to the desired rate.

8 Claims, 2 Drawing Figures

COLOR FILTER WHEEL SYNCHRONIZER

BACKGROUND OF THE INVENTION

This invention relates generally to a color video system having a color filter wheel for generating color data regarding the primary colors utilized in the system and, in particular, to an open loop drive unit for rotating and filter wheel in synchronization with the video field rate.

As evidenced by the disclosures in U.S. Pat. Nos. 2,921,118 and 3,654,385, the use of color filter wheels in video systems has been known for quite some time. For the most part, the drive units for turning the wheels have been rather complex and costly devices generally requiring the use of a feedback network to control the speed of the drive motor. In one such application, an accurately machined light chopper containing a relatively large number of equally spaced grooves or slits is operatively connected to the wheel. The light chopper is arranged to pass between a light source and a photodetector to provide information concerning the wheel's position and its speed. This type of equipment generally consumes a good deal of space and, because of the amount and complexity of the equipment involved, it is relatively expensive and sometimes difficult to maintain.

The use of color video system for viewing remote body regions has become a powerful diagnostic tool in the medical field. In U.S. Pat. No. 4,074,306, a color endoscope is disclosed wherein a filter wheel is employed to sequentially illuminate a target to provide color separated image information which is processed in the video system to present a color separated image of the target area one over the other upon a a television screen. As can be seen, both a sharp image and a faithful reproduction of the original colors is important in making an accurate diagnosis and any loss of image registration on the like will adversely affect the results of the examination.

It should also be noted that most color filter wheel drive systems now in use employ either synchronous AC motors or variable speed DC motors to drive the wheel. In either case, the efficiency of the motor and its associated drive circuitry is relatively low. The use of a stepping motor is therefore very attractive, however, controlling the motor at the required speeds has heretofore been a problem in the art.

SUMMARY OF THE INVENTION

It is therefore an object of the present invention to improve color filter wheels drive systems that are used in association with video systems.

It is a further object of the present invention to provide a color filter wheel drive system wherein a stepping motor is driven in response to a rate signal derived from a high frequency clock signal of a video system through an openloop speed control unit.

A further object of the present invention is to provide an open loop drive for a stepping motor used to drive a color filter wheel having a phase locked loop which is adapted to ramp the motor from a relatively slow rate until phase locking is achieved.

Another object of the present invention is to provide a stepping motor drive for a color television filter wheel that is both self-starting and self-synchronizing.

These and other objects of the present invention are attained in a color video system having a master video clock for generating a clock signal at a given rate, a filter wheel for advancing a series of different color filters through a fixed optical path, a stepping motor for turning the wheel and an open loop motor control unit for synchronizing the stepping rate of the motor to the field rate of the video system in response to the master clock output signal so that the filters are brought past the fixed optical path in timed sequence with each of the video field periods.

BRIEF DESCRIPTION OF THE DRAWINGS

For a better understanding of these and other objects of the present invention, reference is had to the following detailed description of the invention which is to be read in conjunction with the accompanying drawings wherein.

DESCRIPTION OF THE INVENTION

Figure 1:
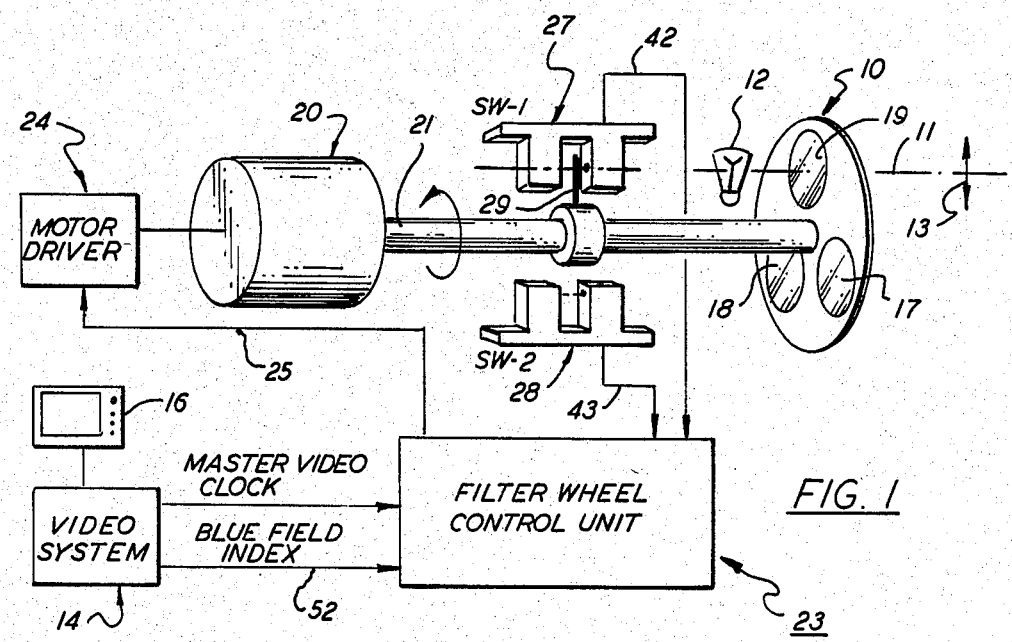
FIG. 1 is a schematic drawing showing a color filter wheel drive system used in a color television system which embodies the present invention.
Figure 2:
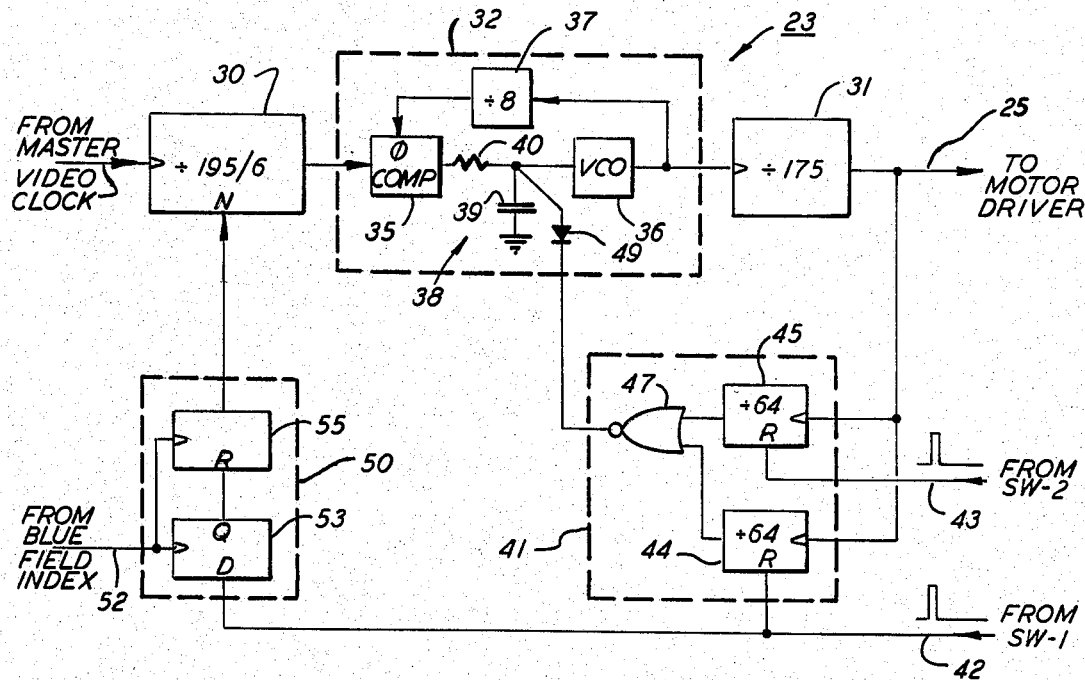
FIG. 2 is a block diagram showing the filter wheel drive unit for synchronizing the stepping rate of the filter wheel drive motor to the video field rate of the television system.

Referring now to FIGS. 1 and 2 of the drawings, there is shown a color filter wheel 10 similar to that described in U.S. Pat. No. 4,074,306 that is arranged to illuminate the target region of an endoscope. Unlike the system disclosed in the subject patent, the filter wheel of the present invention is driven in response to an output signal derived by the master clock of the video system to synchronize the rotational speed of the wheel to the video field rate. The wheel is arranged to rotate a series of different colored filters through a fixed optical path 11 in which is situated a stationary light source 12 used to illuminate a target 13 within the image field of a video camera (not shown) that forms a part of the endoscope's video system 14. The image data provided by the camera is processed in the video system and ultimately presented for viewing on a screen of receiver 16.

The filter wheel contains three separate filters that includes a green filter 17, a red filter 18 and a blue filter 19. The three filters are circumferentially spaced about the wheel so that each filter is passed through the fixed optical path 11 during each ⅓ of a revolution of the wheel. Accordingly, three color separated images of the target are generated during one complete revolution of the wheel. The wheel is directly coupled to a stepping motor 20 via a shaft 21 for rotation therewith. For purposes of explanation, it will be assumed that the motor will advance 15° per step whereby it takes eight steps for each filter to pass through the fixed optical path.

The rotation of the filter wheel is synchronized with the field rate of the video system by means of a control unit 23 that applies a stepping rate signal to the motor driver 24 via line 25 in response to a video clock rate signal provided by the master clock of the video system. A pair of optical switches 27 and 28 are mounted adjacent to the motor shaft 21 whereby each switch is repeatedly opened by a radially extended indexing pin 29 secured to the shaft. As will be explained in greater detail below, the optical switches are adapted to provide information to the control unit relating to the shaft activity.

Referring now to FIG. 2, the control unit 23 of the invention is shown in greater detail. The unit includes a motor synchronization circuit which includes a pair of rate dividers 30 and 31 that are coupled in series through a multiplying phase locked loop 32. The synchronization circuit is arranged between the output of the video timer and the input of the motor driver 24 (FIG. 1). In practice, the two rate dividers are preloaded digital counters having an eight bit input to enable the counters to count down from any desired preselected number or numbers between 1 and 256. As is conventional, the phase lock loop contains a phase comparator 35 that is connected in series with a voltage controlled oscillator 36 through an RC network generally referenced 38. A digital counter 37 provides a feedback circuit between the output of the oscillator and the comparator so that the output rate of the phase locked loop is at some desired multiple of the incoming signal rate furnished by the first rate divider 30.

For explanatory purposes, it shall be assumed that each video field consists of 262.5 lines, each of which contain 130 cycles of the master clock. As noted above, the motor is to be advanced eight steps during each video field. In order that the target be illuminated with one of the primary colors during each field period, the ratio between the master clock frequency and the desired stepping rate is:

$$\frac{\text{Clock cycles/field}}{\text{No. of steps/field}} = \frac{130(262.5)}{8} = \frac{34125}{8}$$

The number of clock cycles generated during each field can be further expressed as a whole number multiplicand, such as 195, and a whole number multiplier, such as 175 (195×175=34125) which are both within the counting range of the divider circuit counters 30 and 31. Accordingly, counter 30 is set to count down, under normal operating conditions, from 195 to 0 before providing an output signal to the phase locked loop while the second counter is set to count down from 175 to 0 before it outputs a signal to the motor driver. Accordingly, the output rate devised by the master clock is reduced by the number of cycles contained in each field. The rate, however, must be increased by a factor of eight in order to provide the desired stepping rate. This is easily accomplished in the present circuit by setting the counter 37 in phase locked loop at an eight count. Accordingly, the output rate of the voltage controlled oscillator 36 is eight times the rate of the feedback to the comparator 35. As can be seen, through use of the open loop synchronization circuit, the speed of the stepping motor is synchronized with the video field rate in response to the output signal of the video master clock.

As should be evident to one skilled in the art, such synchronization of the filter wheel to the video field can be accomplished using low power standard CMOS logic which results in a considerable savings to both space and money when compared to similar devices presently used in the art.

In practice, the operational speed of the filter wheel is well above the speed at which the motor can be stepped discretely between poles. Accordingly, the motor is herein driven in a slewing mode when the wheel is turning at operating speeds. If the desired operational stepping rate were immediately applied to the motor driver at start up, the driver would be unable to handle the high stepping rate and the motor would lock in one position and thus fail to start. The motor therefore must be walked or ramped up to the operational speed at a relatively slow rate. This is achieved through means of an integrating capacitor 39 placed in the coupling network 38 between the phase comparator 35 and the voltage controlled oscillator 36. The capacitor acts in concert with the resistor 40 to establish an RC network having a relatively long time constant. At start up, the charge on the capacitor begins to build up gradually thus correspondingly affecting the stepping rate applied to the driver whereupon the speed of the motor is ramped up slowly to the desired operational rate until such time as phase locking is achieved.

Rotation of the color filter wheel is affirmed by means of the two previously noted optical switches 27 and 28. As the indexing pin 29 is carried through the switches by the rotating shaft output, pulses are generated which are applied to the rotational detector unit 41. Switch 27 is connected via line 42 to the reset terminal of digital counter 44 while switch 28 is connected via line 43 to the reset of a second digital counter 45. Both counters are arranged to count up to 32 stepping pulses before applying an enabling signal to NOR gate 47. If the motor is running at the desired operational speed, each counter is reset every 24 pulses and the count is not reached. Accordingly, the gate holds the base of diode 49 high thus preventing the integrating capacitor from discharging. In the event either switch is not made within the predetermined number of pulses, the output of the gate goes low thus allowing the capacitor to discharge through the diode. This, in turn, causes the motor stepping rate to be slowed whereupon the ramping of the motor back to speed is automatically reinitiated.

The present optical switching arrangement thus is capable of affirming rotation of the motor shaft and also provides a means for automatically ramping the motor back up to speed in the event the motor is not properly started or, after it has reached operational speed, the motor is inadvertently stopped or slowed down. By using two switches in the detection circuit, the generation of false signals is also prevented. A false signal of this nature would be generated in a signal switch network if the filter wheel were to be stopped with the pin in the optical path of the switch.

As shown in FIG. 2, the output signal generated by the optical switch 27 is also applied to the pulse signal input of a D-type flip flop 53. The flip flop is contained in a coincidence detector circuit generally referenced 50 that is adapted to monitor the position of the filter wheel and compare its position with one of the video fields to assure that each of the color filters pass through the fixed light path during the appropriate field period. In this particular example, the blue field is utilized to attain indexing data.

The indexing pin is secured to the shaft so that it makes switch 27 at the same time that the blue filter illuminates the target region. As noted above, the filter is adapted to hold the target illuminated during a period equal to about eight steps of the motor which corresponds to a video field period. If properly indexed, the video system will acquire blue, green and red color information during sequential blue, green and red fields.

A gating signal from the blue field indexing circuit in the video system is applied to the flip flop 53 via line 52. The Q output of the flip flop will follow the pulse input from the optical switch that occurs at the beginning of each field. The output of the flip flop is applied to the reset of a coincidence counter 55. If coincidence between the gating and the pulse signal is maintained, the output of the flip flop remains high and the counter is inhibited. In the event the two inputs to the flip flop occur at different times, the flip flop output goes low and the counter begins to count the blue fields. If the counter reaches a preset count before coincidence is reached, an out of synchronous signal is sent to the first divider 30 in the motor synchronization circuit.

The first rate divider 30 is arranged to change the programmed count from 195 to 196 upon the receipt of an out of synchronous signal from the coincidence detector circuit. In the event the blue field indexing signal and the shaft generated pulse signal are not in coincidence and an out of synchronous signal is generated, the divider is set at a 196 count thus causing the filter wheel to rotate slightly slower than normal. The wheel will fall back about 2° for each revolution until such time as the blue field index and the optical switch pulse applied to the flip flop occur at the same time. At this time, the coincidence counter is reset and the divider automatically reverts to a 195 count.

As should now be evident from the disclosure above, the rate of the filter wheel of the present invention is synchronized with the field rate of the associated video system using a highly efficient yet simple open loop system that wastes very little power when compared to comparable closed loop systems presently used in the art. Although the present filter wheel is used to illuminate a target in the image field of an endoscope camera, it should be clear to any skilled in the art that a wheel placed in any optical path of the video system can be similarly controlled without departing from the teachings of the invention.

While this invention has been described with reference to the structure disclosed herein, it is not confined to the details set forth and this application is intended to cover any modifications or changes as may come within the scope of the following claims.

I claim:

1. A method synchronizing the rotational speed of a color filter wheel to the field rate of a video system that includes the steps of
    driving a color filter wheel with a stepping motor to sequentially advance different color filters past a fixed optical axis,
    deriving the input of the stepping motor from the output of the master clock of the video system,
    adjusting the rate of the stepping motor input signal by an amount equal to the number of cycles of the master clock output signal contained in each video field divided by the number of steps required to bring each color filter past the fixed optical axis,
    phase locking the input signal applied to the motor to the output signal of the master clock by advancing the speed of the motor in steps up to a desired synchronous speed which is related to the video field rate, and
    monitoring the rotational speed of the wheel and automatically reinitiating the stepping of the motor in the event the wheel speed falls below a predetermined rate.

2. The method of claim 1 that includes the further step of indexing a selected one of the color filters with the video field period related to said selected color so that the selected filter moves past the optical axis during said related field period.

3. In a color video system of the type having a master timer for generating a video clock signal at a given rate, apparatus for synchronizing a color filter wheel with the video field rate of the system that includes
    a rotatably mounted color filter wheel having a series of different color filters equally spaced thereon that are passed in sequence through a fixed optical axis as the wheel is rotated,
    a stepping motor connected to the filter wheel by a shaft for advancing the wheel past the said fixed optical axis,
    a motor driver operatively connected to the stepping motor for advancing the motor in response to the rate of an input stepping signal applied to said driver,
    synchronizing means for connecting the output of the master timer to the input of the motor driver that includes a divider circuit for reducing the video clock rate by an amount that is equal to the number of cycles of the master clock output signal contained in each field, and a phase locking circuit having a counter for increasing the rate by the number of steps required to bring each of said color filters past the optical axis to synchronize the stepping rate of the motor with the video field rate,
    said phase locking circuit further including a phase comparator coupled in series with a voltage control oscillator by an integrating capacitor having a charging time that permits the motor to be advanced in discrete steps until synchronous speed is reached, and
    a pair of spaced apart optical switches positioned adjacent to the shaft, and
    an indexing pin affixed to the shaft for repeatedly sequencing the switches and detector means connected to the switches for inhibiting the motor in the event both switches are not sequenced within a given number of turns of the shaft.

4. The apparatus of claim 3 wherein the detector means includes a first rotation detection counter connected to the first of the optical switches for resetting the counter as the indexing pin passes through said first optical switch and a second rotation detection counter connected to the second of said switches for resetting the counter as the indexing pin passes through said second switch, gating means for coupling the output of each counter to the said integrating capacitor to permit discharging of said capacitor in the event that at least one of the counters are not reset within a given count whereby the motor is automatically reramped back up to speed.

5. The apparatus of claim 3 that includes further means for indexing one of the color filters on the wheel with the corresponding video field.

6. In a color video system of the type having a master timer for generating a video clock signal at a given rate, apparatus for synchronizing a color filter wheel with the video field rate of the system that includes
    a rotatably mounted color filter wheel having a series of different color filters equally spaced thereon that are passed in sequence through a fixed optical axis as the wheel is rotated,
    a stepping motor connected to the filter wheel by a shaft for advancing the wheel past the said fixed optical axis,
    a motor driver operatively connected to the stepping motor for advancing the motor in response to the rate of an input stepping signal applied to said driver, synchronizing means for connecting the output of the master timer to the input of the motor driver that includes a divider circuit for reducing the video clock rate by an amount that is equal to the number of cycles of the master clock output signal contained in each field, and a phase locking circuit having a counter for increasing the rate by the number of steps required to bring each of said color filters past the optical axis to synchronize the stepping rate of the motor with the video field rate, and a pair of spaced apart optical switches positioned adjacent the shaft, an indexing pin affixed to the shaft for repeatedly cycling the switches, and a detector means connected to the switches for inhibiting the motor in the event both switches are not cycled within a given period of time.

7. The apparatus of claim 6 wherein the detector means includes a first rotation detection counter connected to the first of the optical switches for resetting the counter as the indexing pin passes through said first optical switch and a second rotation detection counter connected to the second of said switches for resetting the counter as the indexing pin passes through said second switch, gating means for coupling the output of each counter to the said integrating capacitor to permit discharging of said capacitor in the event that at least one of the counters are not reset within a given count whereby the motor is automatically reramped back up to speed.

8. The apparatus of claim 6 that includes further means for indexing one of the color filters on the wheel with the corresponding video field.

* * * * *